United States Patent [19]

Faber

[11] 4,161,569
[45] Jul. 17, 1979

[54] COMPOSITE ELECTRODE FOR STORAGE BATTERIES, ACCUMULATORS AND THE LIKE

[75] Inventor: Peter Faber, Karlstein, Fed. Rep. of Germany

[73] Assignee: Rheinisch-Westfalisches Elektrizitatswerk Aktiengesellschaft, Essen, Fed. Rep. of Germany

[21] Appl. No.: 885,184

[22] Filed: Mar. 10, 1978

[30] Foreign Application Priority Data

Mar. 12, 1977 [DE] Fed. Rep. of Germany ....... 2710907

[51] Int. Cl.² ............................................. H01M 4/72
[52] U.S. Cl. .................................... 429/234; 429/241
[58] Field of Search ................................ 429/234–237, 429/241–244

[56] References Cited

U.S. PATENT DOCUMENTS

| 3,560,262 | 2/1971 | Baba et al. ..................... 429/234 X |
| 3,973,991 | 8/1976 | Cestaro et al. .................. 429/237 X |
| 4,048,406 | 9/1977 | Sandera et al. ................. 429/237 X |
| 4,055,711 | 10/1977 | Ikari .............................. 429/234 X |

Primary Examiner—Charles F. LeFevour
Attorney, Agent, or Firm—Karl F. Ross

[57] ABSTRACT

A composite electrode for storage batteries and the like comprises a metal current-carrying support provided with a surface array of perforations and covered on opposite sides with perforate synthetic-resin layers of net, screen, fabric or the like. These synthetic-resin layers are fused together at points through the openings of the metal support. The synthetic-resin layers may form retaining pockets for the active mass and the latter may be covered on both sides or one side of the electrode with additional layers of porous synthetic-resin material, preferably a fleece or mat of nonwoven synthetic-resin fibers.

9 Claims, 5 Drawing Figures

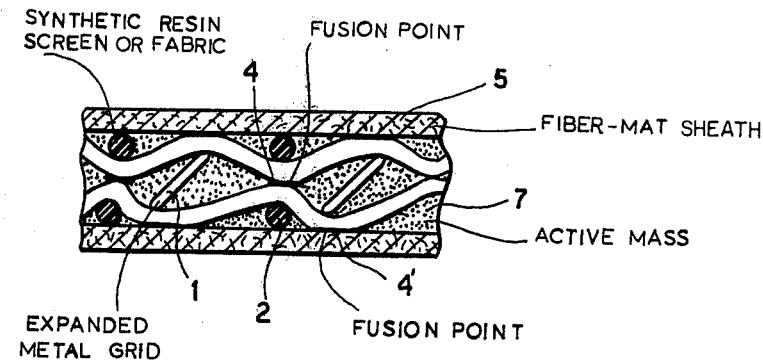
FIG. 3
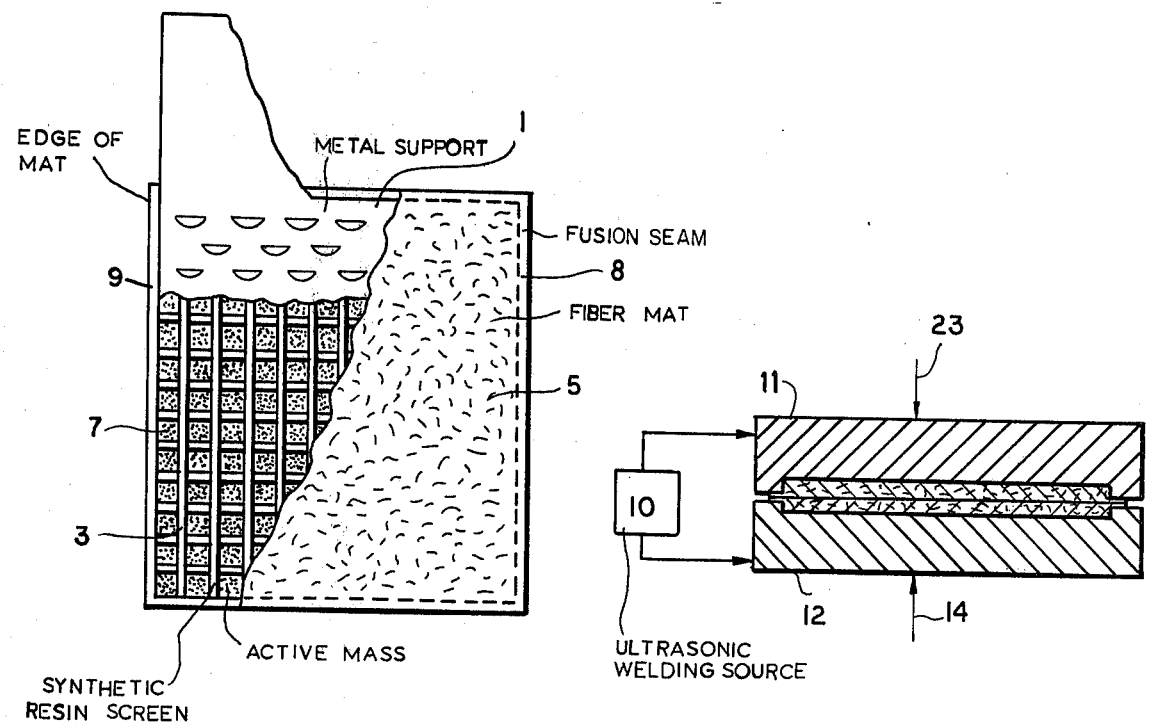
FIG. 4
FIG. 5

COMPOSITE ELECTRODE FOR STORAGE BATTERIES, ACCUMULATORS AND THE LIKE

CROSS REFERENCE TO RELATED APPLICATION

This application is related to the concurrently field copending application entitled METHOD OF MAKING A COMPOSITE ELECTRODE, Ser. No. 885,180.

FIELD OF THE INVENTION

The present invention relates to a composite electrode for accumulators, storage batteries and the like and, more particularly, to an electrode of the type which has a metal support or carrier, serving as a conductive member, and an active mass applied to this carrier.

BACKGROUND OF THE INVENTION

In storage batteries, for example, lead-acid batteries, and other accumulators, it is common practice to apply the active mass (e.g. a lead/lead oxide mass) to a metal carrier which serves as a support for the active mass and as a current collector or current-supply member.

It is also known, in such systems, to apply to the electrode one or more synthetic-resin layers which form pockets in which the active mass is disposed.

Reference may be had to the metal/synthetic resin composite electrode described in German published application (Auslegeschrift) No. 12 31 326 and U.S. Pat. No. 3 060 254. While such composite electrodes have been successful in large measure, it cannot be entirely precluded that the active mass will, as a result of shape change during the charge/discharge cycling and especially swelling and contraction of the electrode, shed the active mass. In other words there is at least a partial loss of the active material as a result of the charge/discharge cycling. The active material appears to deposit outside the synthetic-resin layer or to fall out of the pockets formed thereby. The synthetic-resin layers are usually formed by the sintering of synthetic-resin powder or from a synthetic-resin fibers.

To avoid this problem, it has already been proposed to use tubular constructions for the electrode, these electrodes being referred to generally as sheathed electrodes. In these electrodes, the swelling pressure which is a consequence of volume changes of the active mass, are taken up by the tubes from which the electrode is constituted. Within the tubes there are provided metallic wires serving as current collectors or conductors. The prime difficulty with such electrodes is that they are expensive to fabricate and frequently cannot be made in an entirely reproducible manner so that all of the electrodes made by the process do not have the same characteristics.

OBJECT OF THE INVENTION

It is the object of the present invention to provide a metal/synthetic resin composite electrode which does not deteriorate as a result of volume changes in the active mass during charge/discharge operation and which can be fabricated in a particularly simple and highly reproducible manner.

SUMMARY OF THE INVENTION

This object and others which will become apparent hereinafter are attained, in accordance with the present invention, in a composite electrode which comprises a perforate metal support or carrier which is formed with a surface array of throughgoing openings and a pair of synthetic-resin layers applied to opposite sides of this support and thermally fused together through the openings in the support.

According to the invention, the synthetic-resin layers can be composed of screen, net, fabric or grids of synthetic-resin filaments or strands.

These synthetic-resin layers form pockets in which the active mass is disposed in contact with the metal support or grid. According to a feature of the invention, the synthetic-resin layers can be overlain by fine-porous cover layers of synthetic resin which, in turn, are fused to the synthetic-resin layers first described. These fine-porous synthetic-resin layers can form a sheath in which the active mass is enclosed. According to another feature of the invention, to afford a full or complete sheathing of the active mass, the synthetic-resin layers and, advantageously, the cover layers on both sides of the metal support are welded together continuously along their edges around all of the edges of the metal support structure.

It will be apparent from the foregoing that the synthetic-resin layers applied to the metal support and fused together at points within the openings of this support, constitute a pocketed structure adapted to permit volume change of the active mass while serving as a completely stable structure in the static sense. Mechanical stresses are taken up by the synthetic-resin layers applied directly to the metal support and do not result in a loosening of the mass from the latter. The synthetic-resin layers themselves are connected through the support and hence cannot be released from the metal structure. In addition, the sheathing layers are bonded to the underlying synthetic-resin layers over their entire surfaces and remain structurally connected to the basic electrode components even under the most extreme of expansion conditions.

According to the invention, moreover, the conductive metal support is constituted as a grid, advantageously a cast grid, although preferably it is provided with openings by the slitting/expansion technique known in the art. In other words, the metal support may be a so-called expanded metal structure.

It is also significant that the metal support is covered on both sides with the basic synthetic-resin layers which are formed from synthetic-resin strands fused together through the openings of the metal support. The integration of the synthetic-resin layers with one another and with the metal structure through the openings of the latter by a point-like fusion of the strands of filaments of the synthetic-resin layers provides a multipoint connection.

The fabrication technique is relatively simple and requires only a successive or single-step welding of the synthetic-resin layers together by the application of ultrasonic welding fields and the simultaneous application of pressure. A continuous welding operation can be carried out by passing the electrode structure between a pair of ultrasonically energized rollers. Preferably, however, the electrode structure is pressed between a pair of ultrasonically energized platens.

The active mass can be applied to the pockets thereby formed in the synthetic-resin layers, preferably after a fine-porous sheathing or cover layer is applied to one side of the electrode structure. After the active mass is applied, the other side of the electrode can be covered with a sheathing layer of the fine-porous synthetic-resin material and the entire assembly subjected to a hot pressing or ultrasonic welding operation to bond the newly applied sheathing layer to the previously applied screen, net, fabric or web of synthetic-resin material and to effect the bonding around at least three sides of the rectangular electrode structure.

The active mass can be applied by dry pressing, moist pasting or any other conventional technique.

While the fine-porous sheathing layers can be constituted as powder-porous structures, i.e. sintered from synthetic-resin powder, it is preferably to employ sheathing layers having a fiber structure, preferably a nonwoven fiber net.

The synthetic-resin layers forming the pockets for the active mass and the synthetic-resin cover layers can be composed of the same synthetic-resin material or of different synthetic resins as desired.

BRIEF DESCRIPTION OF THE DRAWING

The above and other objects, features and advantages of the present invention will become more readily apparent from the following description, reference being made to the accompanying drawing in which:

FIG. 3 is a cross-sectional view illustrating features of the invention, shown also in diagrammatic form;

FIG. 4 is a view similar to FIG. 2 but illustrating another feature of the invention; and FIG. 5 is a cross-sectional view through an apparatus for carrying out a process for making the electrode of FIGS. 1 through 4.

SPECIFIC DESCRIPTION

Figure 2:
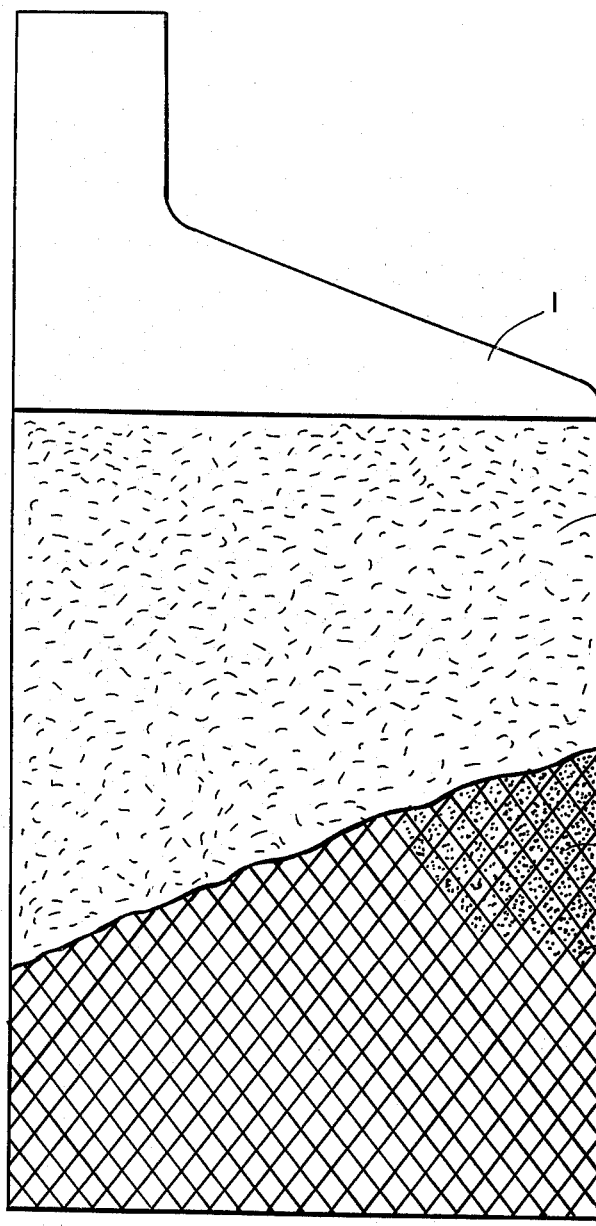
FIG. 2 is an elevational view of the electrode, partly broken away.
Figure 1:
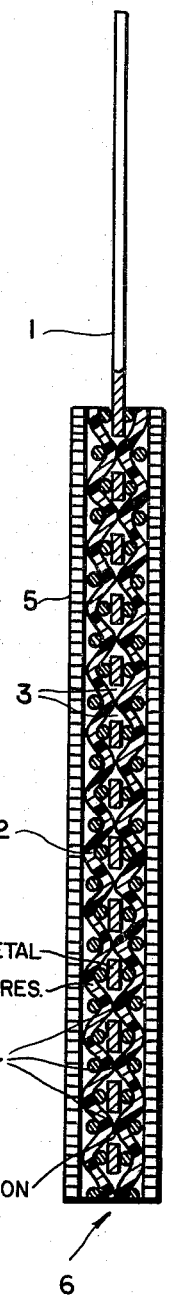
FIG. 1 is a vertical cross-sectional veiw through an electrode according to the invention, the portions thereof being shown in greatly enlarged scale and in diagrammatic form.

The composite electrodes shown in FIGS. 1 through 4 may be used for storage batteries or electrical accumulators in accordance with the examples given below. Basically, each electrode comprises a metal support or carrier 1, shown as a flat plate, provided with openings 3 in a surface distribution, these openings being throughgoing so that they are accessible from either side of the support.

On both sides of the support, there are provided respective synthetic-resin layers 2 formed from synthetic-resin filaments or strands and hence having an open configuration. These synthetic-resin layers 2 can be termed synthetic-resin openworks. The synthetic-resin layers 2 form pockets to receive the active mass which has been shown at 7 in the drawing. The active mass can be pasted in the pockets in a moist state and can then permitted to dry or can be applied under pressure as a powder.

The synthetic-resin layers 2 are welded together at point welds 4 by ultrasonic energy and the application of pressure. The welds 4 are thus formed in the openings 3 of the metal support.

After the application of the active mass, the latter can be sheathed with fine-porous cover layers 5 of synthetic-resin material. The cover layers 5 can be nonwoven fiber fleeces or mats of the same or different synthetic-resin material as that constituting the underlying layers 2, the mats 5 being fused at points 4' to the underlying layer 2.

As can be seen from FIG. 3, the metal support may be an expanded metal grid in which the openings are formed by slitting the metal plate and then stretching the same to rotate portions of the plate between the slits at an angle to the plane of the plate.

The fusion points between the mats 5 and the screens 2 of synthetic-resin monofilament have been shown at 4' in greater detail in FIG. 3.

FIG. 4 shows that the edges of the mats 5 can extend beyond the outlines of the electrode so that they can be welded together and to any projecting portion of the grids or openworks 2 along these edges. The projecting edges are represented at 9 in FIG. 4 and the fusion seams at 8 around the edges of the metal support. The result is a continuous weld seam around the active mass fully encapculating the latter and represented at 6 in FIG. 1.

In FIG. 5 I have shown the fusion of the assembly of FIG. 4 together between a pair of platens 11 and 12 of an ultrasonic welding tool, pressure being applied in the direction of arrows 13 and 14 and the ultrasonic energy being delivered by the ultrasonic welding source 10.

SPECIFIC EXAMPLES

An expanded-metal plate of lead/calcium/tin alloy having dimensions, in the region to be covered by the active mass, of 70 by 120 mm and provided with openings which can each have an area of about 4 mm square, is used as the metal support. The metal plate has a thickness of about 1.3 mm and is covered on opposite sides with synthetic-resin screens of polypropylene having a thickness of 0.5 mm and a spacing of the strand of the screen of about 2 to 3 mm.

All three layers are ultrasonically welded together as illustrated in FIG. 5 with the application of a pressure of 10 to 30 $g/cm^2$ using a flat ultrasonic welding tool. Investigation shows that the two synthetic-resin grids are fused together at points within the openings of the metal support.

In a second ultrasonic welding operation, a nonwoven fiber mat of polyester fibers is fused to one side of the electrode assembly, i.e. to one of the synthetic-resin grids. To this assembly is applied, by doctoring, a moist paste of a positive active mass constituted of a lead/lead dioxide mixture. Such mixtures are commonly used in the storage-battery industry for lead-acid batteries. After drying, the open side of the assembly is sheathed by a second fine-porous polyester nonwoven mat which is ultrasonically welded to the synthetic-resin screen on the formerly open side of the structure. The active mass is thus distributed in the many small pockets of the synthetic-resin screens. The positive electrode is immersed in sulfuric acid and charged in the usual way.

EXAMPLE II

Using a conventional lead/antimony alloy grid for starting batteries having a thickness of 1.3 mm, the process described above is carried out with synthetic-resin webs on either side of this grid. The synthetic-resin layers or sheets have a thickness of 0.5 mm perforated with large openings having dimensions of about 3 × 3 mm.

EXAMPLE IIa

Using the grid of Example II and the perforated sheets described therein, the sheets are applied to the metal grid and the active mass is pasted in the openings of these sheets. After drying of the active mass, the lead/synthetic-resin structure is subjected to high energy ultrasonic fusion to bond the synthetic-resin sheets to one another through the openings in the grid. In a subsequent step, the two cover layers 5 are applied and welded to the synthetic-resin sheets and to one another along the edges of the electrode. Otherwise the electrode is formed up as described in Examples I and II.

EXAMPLE IIb

The procedure of Example II is followed except that the cover layers 5 are applied without previous welding of the synthetic-resin perforated sheets together and the entire assembly is fused ultrasonically together in a single step. In Examples IIa and IIb, the electrodes are formed up in sulfuric acid as described in Example I.

EXAMPLE III

The current collector is a nickle sheet or nickle grid having a thickness of 0.5 to 1.0 mm and the synthetic-resin screens are applied to opposite sides of the current collector as described in Example I. These synthetic-resin screens are welded together ultrasonically and the active mass is applied to the pockets formed by the synthetic-resin screens. The entire assembly is then dried and pressed.

Layers of polyolefin (polyethylene) powder are applied to each side of the electrode structure thus prepared and the assembly is pressed at a temperature of 150° to 250° C. to form the fine-porous layers in situ and encapsulate the active mass. The electrode is then anodically formed up in the usual manner.

The electrodes can be made by the method described in the above-identified copending application which is hereby included by reference in toto.

I claim:

1. A composite electrode for storage batteries and the like, comprising:
a metal support provided with a multiplicity of through-going openings, respective synthetic-resin layers constituted as openwork sheets and flanking said support, said synthetic-resin layers bending toward one another into said openings and being directly fused together through the openings in said support and at points within said openings, an active mass received in the openwork of at least one of said synthetic-resin layers.

2. The composite electrode defined in claim 1, further comprising fine-porous cover layers of synthetic resin overlying and bonded to said synthetic-resin layers.

3. The composite electrode defined in claim 2 wherein said fine-porous layers form a fusion seam with one another around the periphery of said support.

4. The composite electrode defined in claim 2 wherein said fine-porous layers are formed as nonwoven mats of polyester fibers.

5. The composite electrode defined in claim 1 wherein said synthetic-resin layers are welded together around the edges of said support.

6. The composite electrode defined in claim 1 wherein said synthetic-resin layers are formed as screens from synthetic-resin strands.

7. The composite electrode defined in claim 1 wherein said synthetic-resin layers are formed as fabrics.

8. The composite electrode defined in claim 1 wherein said synthetic-resin layers are formed as synthetic-resin nets.

9. The composite electrode defined in claim 1 wherein said synthetic-resin layers are composed of polypropylene.

* * * * *